No. 867,851. PATENTED OCT. 8, 1907.
G. G. SULLIVAN.
AUTOMOBILE TIRE.
APPLICATION FILED NOV. 13, 1906.
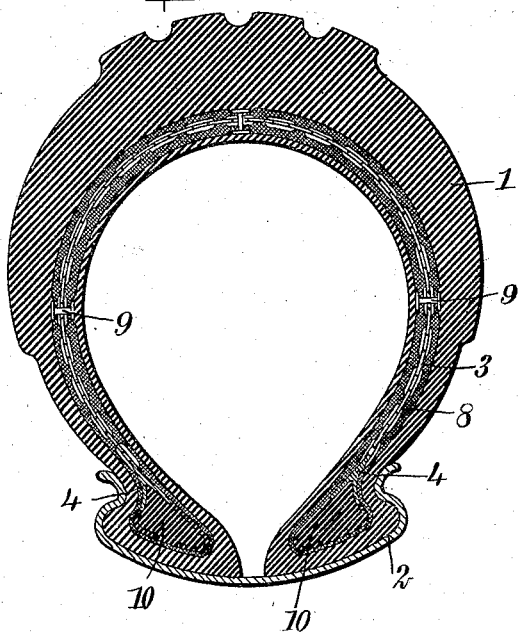
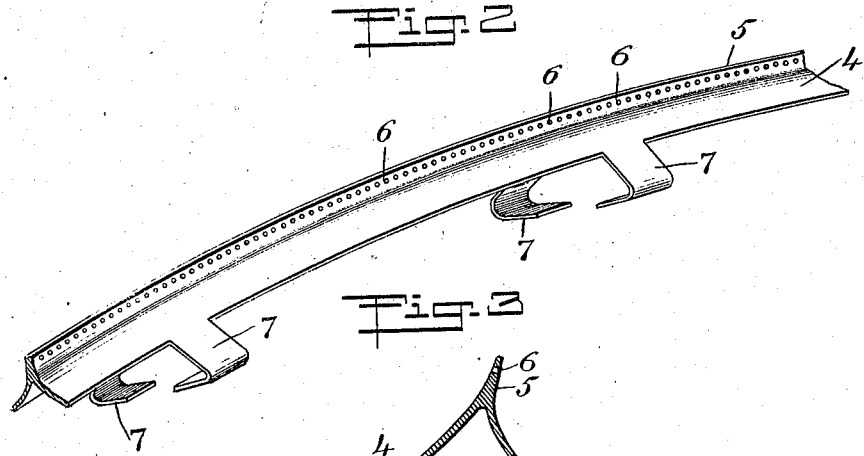
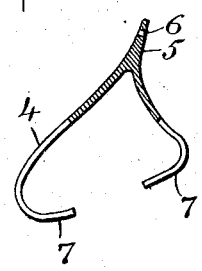
WITNESSES
F. D. Sweet
R. Hardie
INVENTOR
George G. Sullivan
BY Munn & Co
ATTORNEYS

UNITED STATES PATENT OFFICE.

GEORGE G. SULLIVAN, OF BUFFALO, NEW YORK.

AUTOMOBILE-TIRE.

No. 867,851.

Specification of Letters Patent.

Patented Oct. 8, 1907.

Application filed November 13, 1906. Serial No. 343,183.

*To all whom it may concern:*

Be it known that I, GEORGE G. SULLIVAN, a citizen of the United States, and a resident of Buffalo, in the county of Erie and State of New York, have invented a new and Improved Automobile-Tire, of which the following is a full, clear, and exact description.

This invention relates to tires for automobiles, and has for its object to provide means simple in construction, effective in operation and durable in use, adapted to strengthen the entire tire, increase its wearing qualities and prevent the inner tube from expanding and bursting.

Other objects relating to the specific construction and the special arrangement of the several parts of my invention will be understood from the following description and accompanying drawings, in which drawings like characters of reference indicate like parts throughout the views, and in which Figure 1 is a vertical transverse section of an outer tube embodying my invention; Fig. 2 is a perspective view of a section of an anchor ring detached from the outer tube; and Fig. 3 is a vertical transverse section of the ring shown in Fig. 2.

As illustrated in the drawings, 1 represents the casing of an outer tube having enlarged edges and a metallic rim 2 connected therewith. The tube is protected and made puncture-proof by means of a flexible shield inclosed within the outer tube, and consisting of closely woven or linked chain work 3, extending around the entire body in the outer tube, thereby making a shield flexible in construction and adapted to protect the sides as well as the tread of the tire. The shield is connected at its edges at either side with a ring 4, V-shaped in cross section, having a flange 5 on its upper surface provided with perforations 6, by means of which the ring is connected with the links composing the inner shield. The ring 4 is also provided with lateral lips 7 which are adapted to extend partly around a core of hard rubber 10, as shown in Fig. 1, and to be sunk into the surface of said core so as to make the outer surface of the ring flush with the outer surface of said core. The shield is inclosed within a thin layer of rubber and fabric 8 arranged on each side of the shield, and preferably molded or vulcanized to the chain work so as to provide a casing for the shield having a rubber surface adapted to be molded or constructed in the body 1 of the outer tire. In order to add strength to the structure the flexible shield and rubber fabric casing inclosing the same are preferably provided with rivets 9 which are clenched in the rubber and fabric with the rivet heads below the surface of the rubber fabric so as not to interfere with the molding of the tire.

When the parts are constructed and arranged as hereinbefore described, they form an outer tube substantially integral in construction and strengthened to such an extent as to greatly increase the wearing qualities of the tube and protect the inner tube absolutely from puncture in any portion, and such results are accomplished without interfering in the slightest degree with the free and flexible riding qualities of the tire, or with the comfort of the users.

While I have herein shown and described my invention in its preferable form, I do not desire to be limited to such construction, as other means having similar capabilities may be used without departing from my invention.

Having thus described my invention, what I claim as new and desire to secure by Letters Patent is:

1. A link shield arranged between layers of rubber fabric and provided with rings connected therewith, partially surrounding rubber cores.

2. A tire tube having an outer casing, an inner link shield embedded within rubber fabric, V-shaped metallic rings secured to the edges of said shield, and hard rubber cores connected with said rings.

3. A tire tube having a link shield embedded in rubber and fabric, metallic rings secured to the edges of said shield, hard rubber cores connected with said rings, and a metallic rim clamped onto the inner portion of said shield.

4. A tire tube having enlarged edges, a metallic shield embedded in rubber and fabric, rings connected with the edges of said shield, hard rubber cores connected with said rings, and a rim clamping the enlarged edges of said tube.

In testimony whereof I have signed my name to this specification in the presence of two subscribing witnesses.

GEORGE G. SULLIVAN.

Witnesses:
SAMUEL EDWARD HOLMES,
WILLIAM J. PRANGE.